Figure 1:
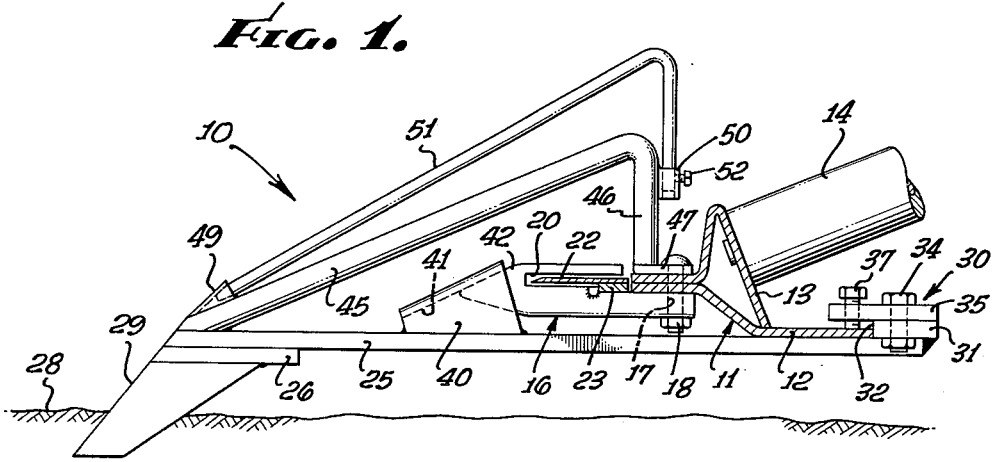

Jan. 5, 1965     A. S. LIGHTSEY     3,163,975
CROP LIFTER ASSEMBLY
Filed May 13, 1963

INVENTOR.
ARTHUR S. LIGHTSEY
BY
ATTORNEY.

United States Patent Office 3,163,975
Patented Jan. 5, 1965

3,163,975
CROP LIFTER ASSEMBLY
Arthur S. Lightsey, P.O. Box 39, Cantua Creek, Calif.
Filed May 13, 1963, Ser. No. 279,846
4 Claims. (Cl. 56—313)

This invention relates to improvements in crop harvesting machines and more particularly to a crop lifter assembly adapted to be detachably secured to the sickle bar of a mower, windrower, combine or like type harvesting machine and incorporating the improvements and novel features hereinafter set forth.

When harvesting certain crops growing close to the ground or others bent over close to the ground by storm damage or by the weight of the grain carried thereby, serious harvesting losses are likely to occur unless the foliage can be elevated above the sickle knife as the harvesting machine advances during the harvesting operation. To meet these needs various crop lifter attachments have been proposed heretofore adapted to be secured to the sickle bar and involving various finger constructions projecting forwardly of the sickle knife for the purpose of lifting the crop and supporting it while the stalk is being cut.

However crop lifter consructions as heretofore proposed exhibit certain deficiencies and shortcomings sought to be obviated by the present invention. Many of the former constructions, though quite satisfactory when attached to horsedrawn harvesting machines, are found entirely inadequate to meet the needs of present day power propelled harvesting machines operating at considerably higher speeds and subject to much more severe shocks and load stresses. Should any component of the crop lifter assembly fail, these are quite likely to become engaged with the cutting bar or to be carried into the harvesting machinery where very serious consequences inevitably follow. It is therefore of the utmost importance that the lifter assembly be foolproof against becoming loose, detached, broken or carried into the harvesting machine.

Another prevailing deficiency of prior designs is their lack of suitable provision for accommodating widely different crops and for elevating certain crops to a higher elevation than others. Present day combines and power harvesters are very versatile and adapted to harvest many different types of crops and it is important that the crop lifter assembly include provision for accommodating the widely differing foliage capable of being harvested by these machines.

In view of the above identified and other shortcomings of prior designs, the crop lifter assembly of this invention has been designed to obviate these and to provide a unitary construction having three widely spaced facilities for rigidly anchoring the assembly to the sickle bar assembly of power propelled harvesting machines. The crop lifter includes an elongated rigid main body provided at its rear end with a wide rigid clamp snugly embracing the rear lateral edge of the sickle bar, a socket in its midforward portion snugly embracing the pointed end of the sickle bar guard, and a third rigid anchorage to the midportion of the sickle bar utilizing the bolt holding the overlying guard member to the sickle bar. Another feature of importance is the provision of a ground penetrating blade at the forward end of the lifter designed to underride any foliage close to the ground and to guide the same onto the main foliage lifting components.

Accordingly it is a primary object of the present invention to provide a crop lifter assembly adapted to be readily attached to sickle bar of a harvesting machine and characterized by its ruggedness, rigidity and simple yet highly effective means for attaching it to the harvester.

Another object of the invention is the provision of a crop lifter made in one unitary assembly and found highly reliable and efficient for use on power driven large capacity windrowers and harvesters.

Another object of the invention is the provision of a unitary corp lifter assembly having auxiliary attachment means for increasing its foliage lifting capabilities.

These and other more specific objects will appear upon reading the following specification and claims and upon considering in connection therewith the attached drawing to which they relate.

Referring now to the drawing in which a preferred embodiment of the invention is illustrated.

Figure 2:
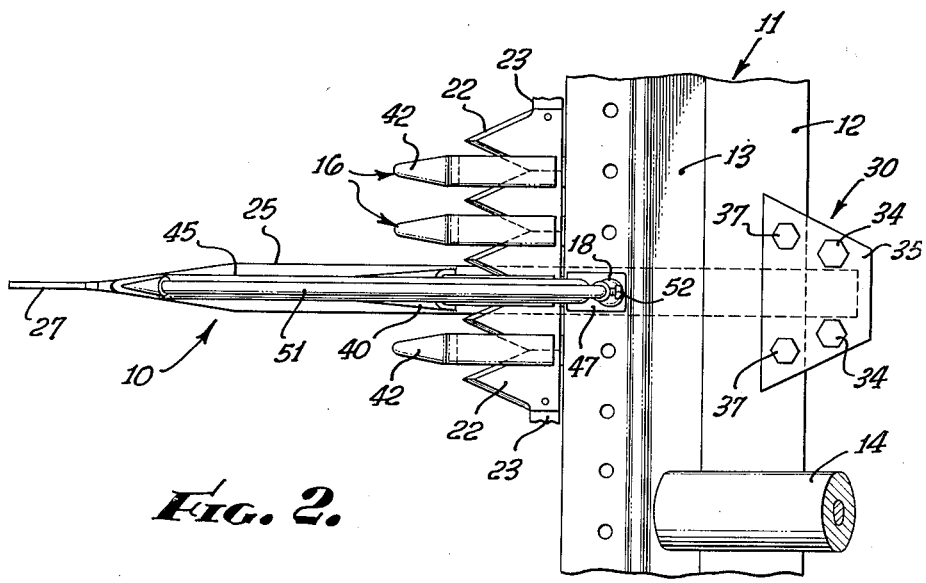

FIGURE 1 is a cross sectional view through a harvester sickle bar showing the invention mounted thereon; and FIGURE 2 is a top plan view of FIGURE 1.

Referring to the drawing, there is shown a preferred embodiment of the crop lifter designated generally 10 mounted in a typical operating position on the sickle bar 11 of a heavy duty self-propelled windrower or harvester, not shown. As herein illustrated the sickle bar includes a lower heavy gauge rolled steel strip 12 extending the full length of the cutting bar and an overlying V-shaped plate 13 suitably secured, as by welding, to the juxtaposed surfaces of the lower strip 12. The inclined rear face of upper member 13 is normally employed to support the lower ends of rollers 14 supporting wide canvas conveyor belting serving to transport the cut foliage to some other part of the harvester or into a windrow forming discharge port. Since these conveyors and the components cooperating therewith are well known to persons skilled in this art and form no part of the present invention, they need not be further referred to herein.

Rigidly but detachably secured to the forward lateral edge of sickle bar 11 is a row of guard members 16, 16 of well known construction each having a single bolt hole 17 extending vertically through its rear end for assembly bolt 18. This bolt passes through aligned openings in sickle bar members 12 and 13, as is clearly shown in FIGURE 1. Each guard member is provided with a slot 20 across which sickle knives 22 are reciprocated in well known manner, these knives being riveted to a supporting bar 23 and reciprocated by a pitman mechanism, not shown.

Crop lifter 10 has a long main body 25 formed from a thick strip of rolled steel or the like. Rigidly welded to its lower forward end is a reinforcing plate 26 and a ground penetrating lifter blade. This blade is inclined downwardly and forwardly with its lower tip arranged to barely penetrate the surface of the ground. This assures that the lifter will underride any foliage close to or slightly embedded in the ground by reason of heavy rains or flowing water, cultivation or the like and elevated by the sloping forward edge 29 of the blade onto higher components of the lifter assembly.

The rear end of main body 25 is provided with a clamping assembly 30 comprising a thick plate 31 welded to the upper surface of the main body in such position that its relative long forward edge 32 will bear snugly against the rear edge of the sickle bar member 12. Movably secured to plate 31 as by a pair of clamping bolts 34 is a movable clamping plate 35 having the general configuration illustrated in FIGURES 1 and 2. Normally member 31 is sufficiently thick to provide assurance of being as thick as or slightly thicker than the rear lateral edge of typical sickle bars. The forward edge of clamping plate 35 overlies the rear edge of the sickle bar and is provided with adjustable clamping members, such as a pair of cap screws 37, which may be tightened against the upper surface of the sickle bar as soon as mounting bolts 34 have been firmly tightened.

Another portion of the crop lifter mounting means comprises an inverted U-shaped socket member 40 having the configuration shown in FIGURES 1 and 2 and providing a forwardly converging socket 41 shaped to receive and tightly seat over the pointed forward end 42 of a guard 16. The upwardly and rearwardly inclined top wall of socket 41 forces the forward end of the crop lifter upwardly with the top surface of main body 25 pressing forcibly against the underside of the sickle bar member 12 thereby greatly augmenting the rigidity of the anchorage provided for the crop lifter.

The foilage lifting facilities of the crop lifter include a permanently installed inverted V-shaped member 45 having its forward end welded to the foremost end of the lifter body directly above the upper end of blade 29. The rear end of the foliage elevating member includes a vertical leg 46 forged at its lower end to provide a flat horizontally disposed plate 47 having an opening directly overlying and registering with holes 17 for guard assembly bolt 18 which is utilized to clamp mounting plate 47 firmly against the upper surface of the sickle bar.

To provide still greater foliage lifting capability under adverse conditions, assembly 10 is preferably provided with a pair of sockets 49 and 50 for seating therein the opposite ends of one of a series of graduated sizes of auxiliary and supplemental foliage lifters, one of which is indicated at 51. Both ends of this auxiliary lifter are preferably tapered to facilitate their assembly and firm anchorage in the respective mounting sockets 49 and 50. Desirably, at least one of the sockets 50 is provided with a clamping screw 52 for positively locking the auxiliary attachment in position.

The method of attaching lifter assembly 10 to the harvester sickle bar will be quite apparent from the foregoing detailed description of its construction and anchorage means. Normally the lifters are mounted at intervals along the sickle bar in the number found necessary to handle the particular crop undergoing harvesting. After location of a given lifter has been decided upon the appropriate guard mounting bolt 18 is removed and bolts 34 of the clamping facility 30 are detached. The workman then telescopes socket member 40 of the lifter over the pointed forward end of a guard 16 and forces it onto the guard until edge 32 of member 31 can be pressed behind the rear edge of sickle bar member 12. This having been accomplished, guard bolt 18 is inserted through the aligned openings and firmly tightened. Clamping plate 35 is also secured in place by bolts 34 and after these have been tightened set screws 37 are tightened. Assembly 10 is now rigidly and immovably anchored to the sickle bar and in readiness for use.

While the particular crop lifter assembly herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A crop lifter assembly adapted to be rigidly clamped to the sickle bar of a harvesting machine with the forward end of said assembly projecting forwardly of the sickle bar and effective to elevate foliage of a crop above the sickle knife while its stalk is being severed, said crop lifter assembly having an elongated rigid main body adapted to be clamped against the underside of the sickle bar, with its rear end embracing the rear lateral edge of the sickle bar, clamping means including set screw means adjustably carried in the end of said main body for high pressure clamping engagement with the upper surface and rear edge of the sickle bar, socket means on the upper side of the midportion of said main body positioned to seat snugly over the forward end of a sickle guard member, the forward end of said main body being reinforced and supporting a vertically-disposed ground-penetrating foliage lifting blade having its forward edge inclined upwardly and rearwardly toward the sickle bar, and foliage lifting means of inverted V-shape overlying said main body strip with its forward end welded to said main body above said ground penetrating blade, the rear end of said foliage lifting means having a flat portion lying parallel to the upper surface of the sickle bar and having an opening in alignment with a guard bolt hole through the sickle bar and adapted to be rigidly anchored to the sickle bar by the guard mounting bolt for the guard having its forward end seated in said socket means.

2. A crop lifter assembly for use on the sickle bar subassembly of a harvesting machine of the type having a long sickle bar provided with a reciprocable sickle and a row of guard members embracing said sickle and distributed along the forward edge of the sickle bar, said crop lifter assembly being rigidly securable to three different areas of the sickle bar subassembly and in general alignment with one another transversely of the sickle bar subassembly and comprising, a long flat main body having an upright blade at its forward end having a leading edge projecting downwardly and forwardly and normally disposed to penetrate the ground, wide rigid clamping means secured to the rear end of said main body and adapted to embrace the rear edge of the sickle bar snugly and having adjustable means bearing tightly against the upper surface of the sickle bar, socket means on the upper side of the midportion of said main body positioned to snugly seat the forward end of the overlying sickle guard, an upwardly and rearwardly inclined foliage lifter having its forward end fixed to the forward end of said main body, the rear end of said lifter having a base plate lying closely spaced above the top side of said main body provided with a mounting opening in registry with the guard mounting bolt, and a guard mounting bolt rigidly clamping said plate and the adjacent guard rigidly to the upper and lower surfaces respectively of said sickle bar.

3. A crop lifter assembly as defined in claim 2 characterized in the provision of supplemental detachable foliage lifter means comprising an elongated rod generally similar in shape to said first mentioned foliage lifter, socket means on the opposite ends of said foliage lifter for receiving and seating the opposite ends of said supplemental lifter means and including means for holding the same firmly seated in said socket means.

4. A crop lifter assembly as defined in claim 2 characterized in that said clamping means at the rear end of said main body is shaped to abut an extended length of the rear edge of said sickle bar to stabilize said crop lifter assembly and to resist lateral displacement of both ends thereof.

References Cited in the file of this patent
UNITED STATES PATENTS

| | | |
|---|---|---|
| 361,552 | Seidl | Apr. 19, 1887 |
| 2,214,965 | Love | Sept. 17, 1940 |
| 2,839,884 | Bishop | June 24, 1958 |